(12) United States Patent
Huang et al.

(10) Patent No.: US 12,719,640 B2
(45) Date of Patent: Aug. 25, 2026

(54) CONTROL CHANNEL DESIGN IN ORBITAL ANGULAR MOMENTUM (OAM) BASED COMMUNICATION SYSTEM

(71) Applicant: QUALCOMM Incorporated, San Diego, CA (US)

(72) Inventors: Min Huang, Beijing (CN); Danlu Zhang, San Diego, CA (US); Chao Wei, Beijing (CN); Hao Xu, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 307 days.

(21) Appl. No.: 18/562,182

(22) PCT Filed: Jul. 17, 2021

(86) PCT No.: PCT/CN2021/106959

§ 371 (c)(1),
(2) Date: Nov. 17, 2023

(87) PCT Pub. No.: WO2023/000117

PCT Pub. Date: Jan. 26, 2023

(65) Prior Publication Data

US 2024/0243884 A1 Jul. 18, 2024

(51) Int. Cl.
*H04L 5/00* (2006.01)
*H04J 14/00* (2006.01)
(Continued)

(52) U.S. Cl.
CPC ............ *H04L 5/0053* (2013.01); *H04J 14/04* (2013.01); *H04J 14/07* (2023.08); *H04L 5/0007* (2013.01); *H04W 72/232* (2023.01)

(58) Field of Classification Search
None
See application file for complete search history.

(56) References Cited

U.S. PATENT DOCUMENTS

2015/0333865 A1 11/2015 Yu et al.
2017/0187442 A1 6/2017 Luddy et al.
(Continued)

FOREIGN PATENT DOCUMENTS

WO 2020262743 A1 12/2020
WO 2020262744 A1 12/2020
WO 2021093321 A1 5/2021

OTHER PUBLICATIONS

International Search Report and Written Opinion—PCT/CN2021/106959—ISA/EPO—Mar. 30, 2022.
(Continued)

*Primary Examiner* — Walter J Divito
(74) *Attorney, Agent, or Firm* — Patterson + Sheridan, L.L.P.

(57) ABSTRACT

Aspects of the present disclosure relate to wireless communications, and more particularly, to techniques for techniques for signaling control information in wireless communication systems based on orbital angular momentum (OAM) modes. One aspect provides a method for wireless communication by a transmitter. The method generally includes transmitting to a receiver, with a first orbital angular momentum (OAM) mode, a first control channel on a first time-frequency resource and transmitting to the receiver, with a second OAM mode, at least one of a data channel or a second control channel on a second time-frequency resource that at least partially overlap with the first time-frequency resource in at least one of time or frequency.

29 Claims, 13 Drawing Sheets

(51) Int. Cl.
*H04J 14/04* (2006.01)
*H04W 72/232* (2023.01)

(56) References Cited

U.S. PATENT DOCUMENTS

| | | | | |
|---|---|---|---|---|
| 2019/0182083 | A1 | 6/2019 | Ashrafi | |
| 2020/0304180 | A1 | 9/2020 | Lee et al. | |
| 2021/0028560 | A1 | 1/2021 | Zenkyu et al. | |
| 2021/0037397 | A1* | 2/2021 | Guo ....................... | H04B 7/088 |
| 2022/0278723 | A1 | 9/2022 | Yu | |
| 2022/0321213 | A1 | 10/2022 | Lee et al. | |

OTHER PUBLICATIONS

Supplementary Partial European Search Report—EP219503851—Search Authority—Munich—Feb. 25, 2025.

Cheng W., et al., "Orbital Angular Momentum for Wireless Communications", IEEE, Wireless Communications, Coordinated Science Laboratory, Department of Electrical and Computer Engineering, University of Illinois at Urbana-Champaign, US, vol. 26, No. 1, Feb. 1, 2019, XP011709538, ISSN: 1536-1284, DOI: 10.1109/MWC.2017.1700370, pp. 100-107.

Supplementary European Search Report—EP21950385—Search Authority—Munich—Jun. 30, 2025.

* cited by examiner

100
IP Services
197
IP Services
176
Core Network
190
EPC
160
Other AMFs
193
AMF
192
SMF
194
UPF
195
UDM
196
184
HSS
174
Other MMEs
164
MME
162
MBMS GW
168
Serving Gateway
166
BM-SC
170
PDN Gateway
172
132
OAM Component
199
OAM Component
198
102/180
184
182'
182
182''
104
158
110
120
134
102
102 (102')
110 (110')
150
152
154

One Frame (TDD)
10 ms
300
subframe
RB
slot

OFDM symbol
subcarrier
DMRS $R_x$
CSI-RS
330
PDCCH
SSS
PSS
PDSCH
PBCH
SS/PBCH Block
20 RBs system bandwidth RBs
One Frame (TDD)
10 ms
350
subframe
RB
slot OFDM symbol
351
SRS
349
subcarrier
DMRS R
SRS Comb 0
SRS Comb 1
380
PUCCH
PUSCH

CONTROL CHANNEL DESIGN IN ORBITAL ANGULAR MOMENTUM (OAM) BASED COMMUNICATION SYSTEM

CROSS-REFERENCE TO RELATED APPLICATIONS

This application is a national stage application under 35 U.S.C. 371 of PCT/CN2021/106959, filed Jul. 17, 2021, which is hereby expressly incorporated by reference herein in its entirety as if fully set forth below and for all applicable purposes.

INTRODUCTION

Aspects of the present disclosure relate to wireless communications, and more particularly, to techniques for signaling control information in wireless communication systems based on orbital angular momentum (OAM) modes.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect of the present disclosure provides a method for wireless communication by a transmitter. The method generally includes transmitting to a receiver, with a first orbital angular momentum (OAM) mode, a first control channel on a first time-frequency resource and transmitting to the receiver, with a second OAM mode, at least one of a data channel or a second control channel on a second time-frequency resource that at least partially overlap with the first time-frequency resource in at least one of time or frequency.

One aspect provides a method for wireless communication by a receiver. The method generally includes receiving from a transmitter, with a first orbital angular momentum (OAM) mode, a first control channel on a first time-frequency resource and receiving from the transmitter, with a second OAM mode, at least one of a data channel or a second control channel on a second time-frequency resource that at least partially overlap with the first time-frequency resource in at least one of time or frequency.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for signaling control information in wireless communication systems based on orbital angular momentum (OAM) modes.

For example, an OAM transmitter may transmit a new control channel (e.g., a control channel that is not currently defined by existing standards) at the same time-frequency resource with a data channel or another control channel. This new control channel may be transmitted with a different OAM mode than the data channel or other control channel.

The new control channel may be transmitted with the same direction or different directions with the data channel or the other control channel. The new control channel may be transmitted on different waveforms, for example, a single-carrier waveform (such as single-carrier frequency division multiplexing-SC-FDM) or a multi-carrier waveform (such as OFDM).

For example, if SC-FDM is used in the OAM communication link, the control channel and data channel may be multiplexed via time-division multiplexing (TDM) and (OAM) mode-division multiplexing (MDM). MDM may be considered a special kind of spatial division multiplexing (SDM) in which the spatial channels have constant orthogonality (due to orthogonality of different OAM modes). If a multi-carrier waveform is used in the OAM communication link, the control channel and data channel may be multiplexed in TDM, frequency-division multiplexing (FDM), and MDM.

The techniques presented herein may be applied in various bands utilized for NR (5G) and future systems (e.g., 5G+, 6G, and beyond). OAM communication tends to perform well in short/middle-distance wireless communication (backhaul/access), especially at high frequency spectrum (e.g., sub-THz, THz).

Introduction to Wireless Communication Networks

Figure 1:
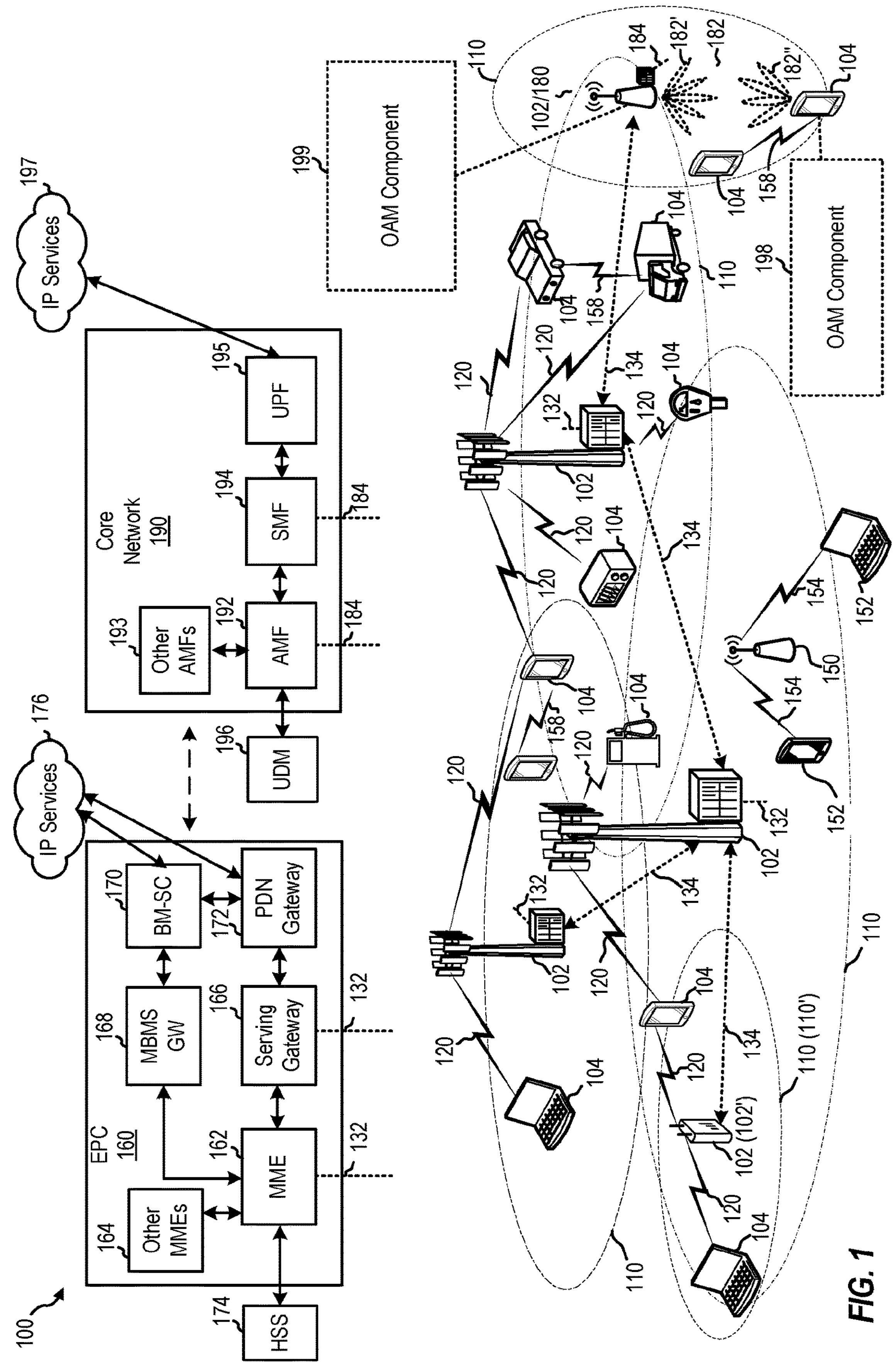
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102 (which may also be referred to herein as access node (AN) 102), user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 7:
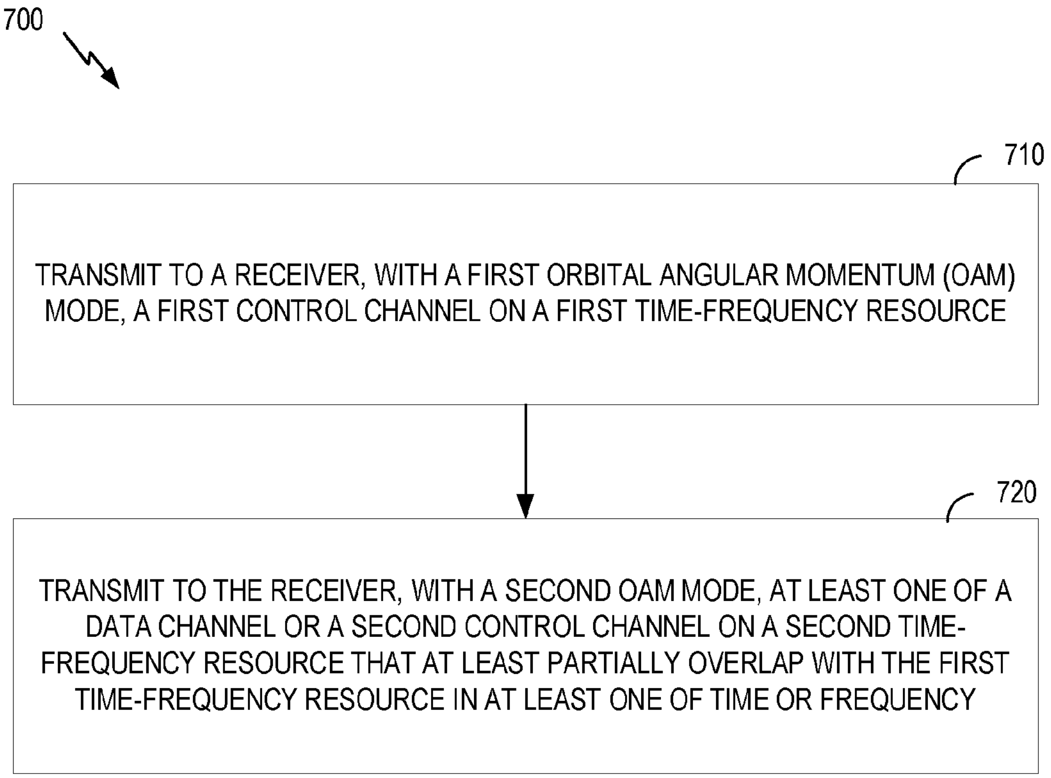
FIG. 7 illustrates example operations for wireless communication by a transmitter, in accordance with certain aspects of the present disclosure.
Figure 8:
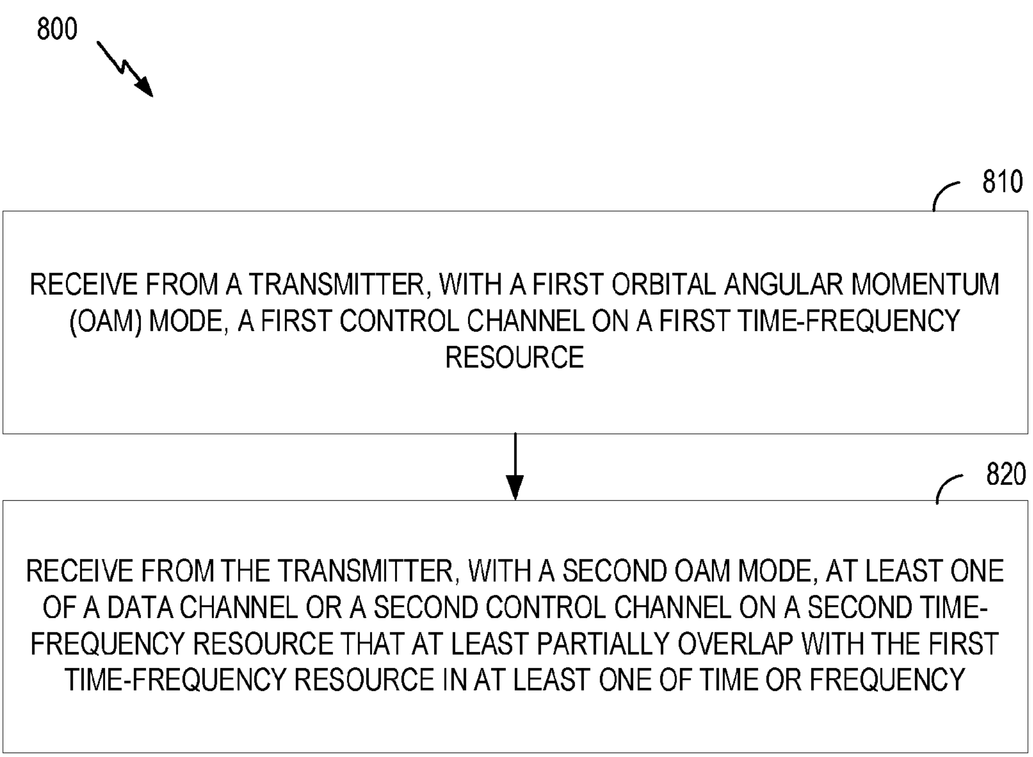
FIG. 8 illustrates example operations for wireless communication by a receiver, in accordance with certain aspects of the present disclosure.

Wireless communication network 100 includes an OAM component 198, which may configure a UE to perform operations 700 of FIG. 7 and/or operations 800 of FIG. 8. Wireless communication network 100 includes an OAM component 199, which may configure a network entity (e.g., a base station, such as a gNB) to perform operations 700 of FIG. 7 and/or operations 800 of FIG. 8.

Figure 2:
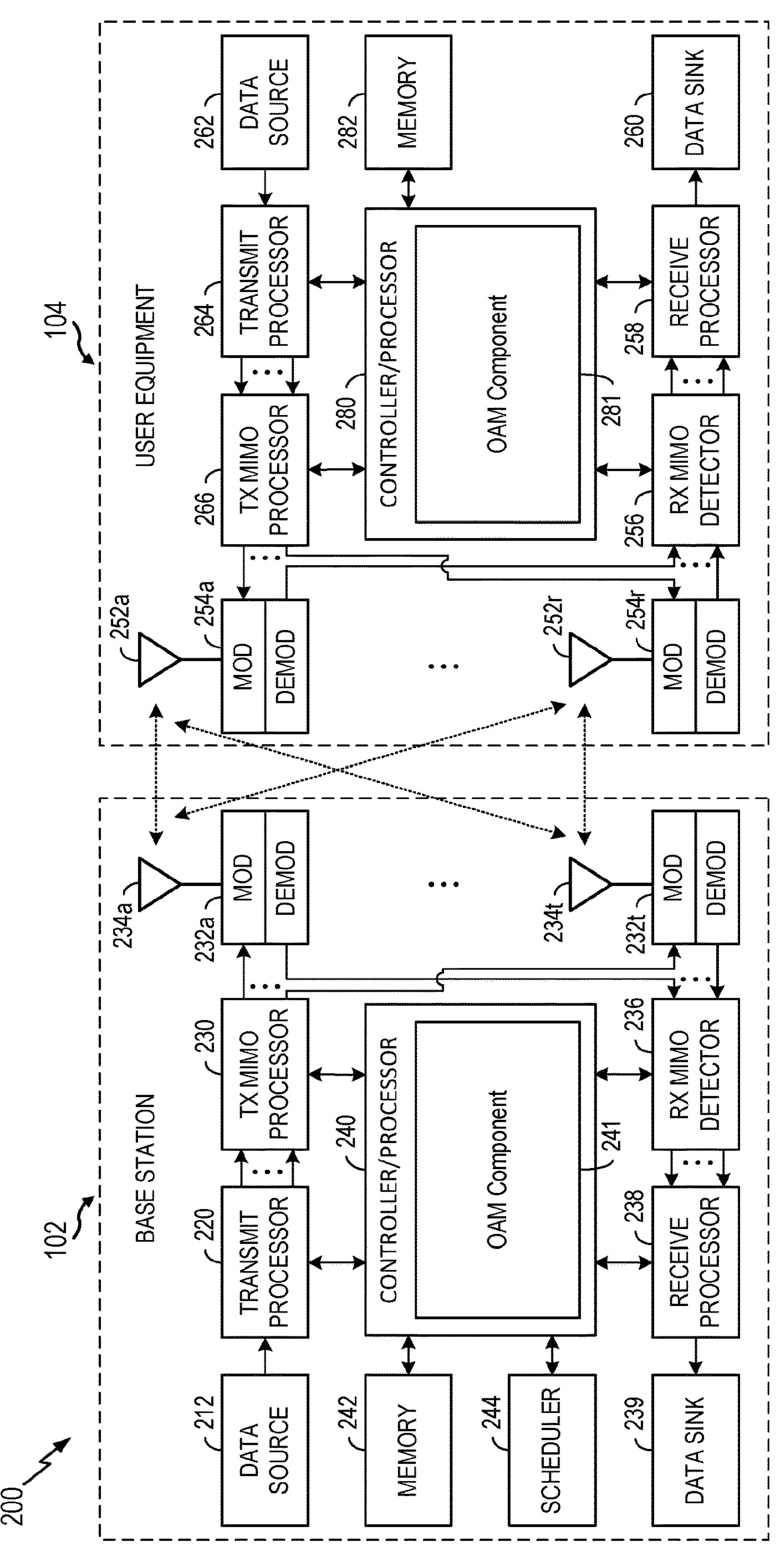
FIG. 2 is a block diagram conceptually illustrating aspects of an example base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively antennas 234), transceivers 232*a-t* (collectively transceivers 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes an OAM component 241, which may be representative of OAM component 199 of FIG. 1. Notably, while depicted as an aspect of controller/processor 240, an OAM component 241 may be implemented additionally or alternatively in various other aspects of base station 102 in other implementations.

Generally, user equipment 104 includes various processors (e.g., 258, 264, 266, and 280), antennas 252*a-r* (collectively antennas 252), transceivers 254*a-r* (collectively transceivers 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes OAM component 281, which may be representative of SL component 198 of FIG. 1. Notably, while depicted as an aspect of controller/ processor 280, OAM component 281 may be implemented additionally or alternatively in various other aspects of user equipment 104 in other implementations.

Figures 3A, 3B, 3C, 3D:
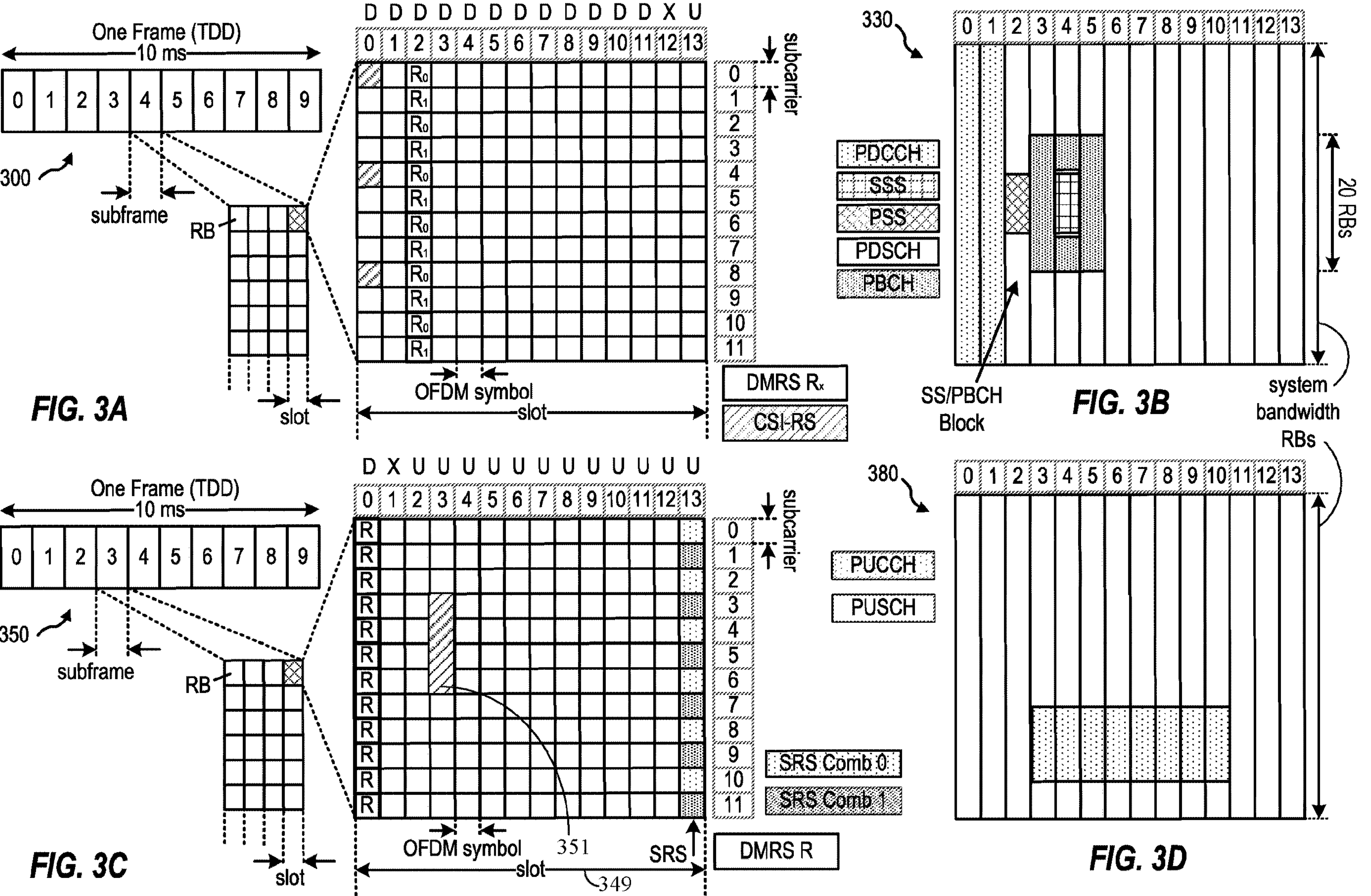
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe. In some aspects, UEs may be configured to communicate (e.g., via SL communications) using the frame format described with respect to diagrams 300, 330, 350, 380. A radio frame (e.g., as shown in diagram 300) may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS, during which SL communication may occur. Further discussions regarding FIG. 1, FIG. 2, and FIGS. 3A-3D are provided later in this disclosure.

As noted above, the techniques presented herein may be applied in various bands utilized for NR (5G) and future systems (e.g., 5G+, 6G, and beyond). For example, the higher band referred to as FR4 (e.g., 52.6 GHz-114.25 GHZ), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used. The techniques may also be applied in the FR1 band (4.1 GHz to 7.125 GHZ), for example, may be used for channel state information (CSI) feedback, control messages, or on control plane signaling.

Overview of OAM-Based Communications

Orbital angular momentum (OAM) refers to the component of angular momentum of a light beam that is dependent on the spatial distribution, rather than on the polarization. The OAM component can be visualized as a waveform with a helical phase. The OAM-based waveform has different modes (due to different topological charges), which are orthogonal to each other. As traditional resources (e.g., frequency, time, and space) are efficiently utilized, the orthogonality of different OAM modes may help address capacity and performance demands of current and future wireless networks.

OAM-based communication systems may perform well in short/middle-distance wireless communication, particularly at high frequency spectrum (e.g., sub-THz, THz). Examples of such scenarios include wireless backhaul transmissions (e.g., from a base station to relay node), fixed wireless access (e.g., from a base station to a UE or Customer Premises Equipment (CPE)), or inter-device transmission (e.g., from fixed UE to fixed UE or inter-server connections in a data center).

Communication based on OAM mode-division multiplexing (MDM), due to its capability to provide high-order spatial multiplexing, may be regarded as a potential technological enhancement for future systems (e.g., 5G+ or 6G and beyond systems) that aim to provide further higher data rate than current systems.

In systems utilizing OAM multiplexing, an OAM transmitter radiates multiple coaxially propagating, spatially-overlapping waves (e.g., OAM mode $l= \ldots, -2, -1, 0, 1, 2, \ldots$) each carrying a data stream through a pairs of apertures. An electro-magnetic (EM) wave with a helical transverse phase of the form $\exp(i\varphi l)$ carries an OAM mode waveform, where $\varphi$ is the azimuthal angle and $l$ is an unbounded integer (referred as OAM order). Traditional EM beams (such as Gaussian beams) may be considered OAM beams with $l=0$.

Theoretically, these waves can be orthogonally received at the same radio (time-frequency domains) resource, and thus using OAM multiplexing can greatly improve communication spectrum efficiency with relatively low receiver (Rx) processing complexity. In some cases, polarization can be added to each OAM mode to double the number of orthogonal streams.

Figure 4:
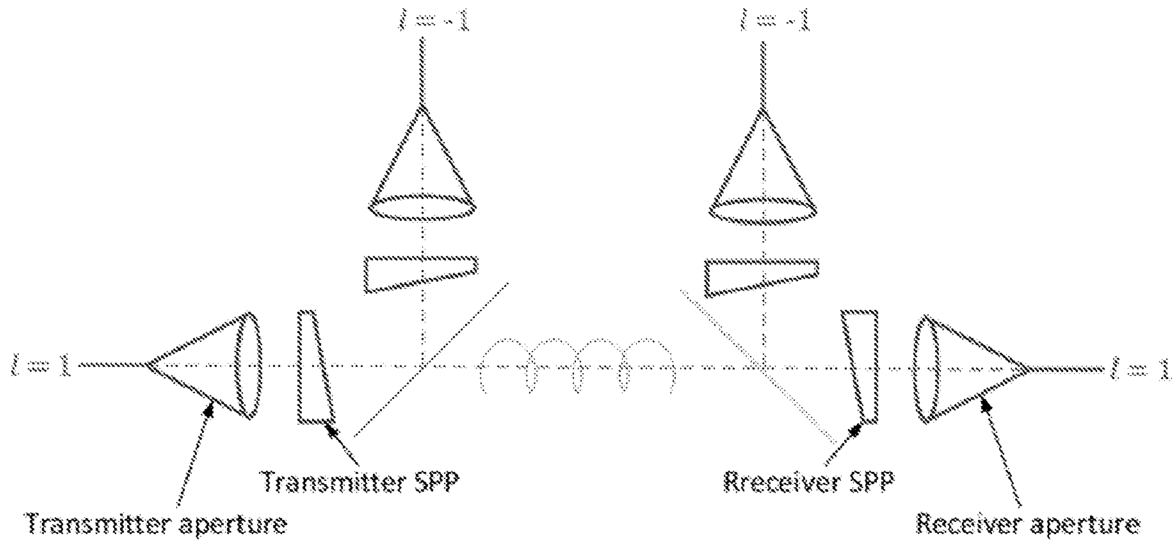
FIG. 4 illustrates an example of an orbital angular momentum (OAM) based communication system, in accordance with certain aspects of the present disclosure.

FIG. 4 illustrates one example of an OAM based communication system that uses a number of transmitter apertures, transmitter spiral phase plates (SPPs), receiver SPPs and receiver apertures. In general, each transmitter aperture transmits the spiral wave of one OAM mode, modulated by the transmitter SPP. In the illustrated example, OAM modes $l=1$ and $l=-1$ are transmitted.

At the receive side, each receiver aperture receives the wave of one OAM mode ($l=1$ or $l=-1$), which is demodulated by the receiver SPP. Due to the mutual orthogonality among OAM modes, the wave of one OAM mode cannot be received by the receiver aperture of the other OAM mode.

Figure 5:
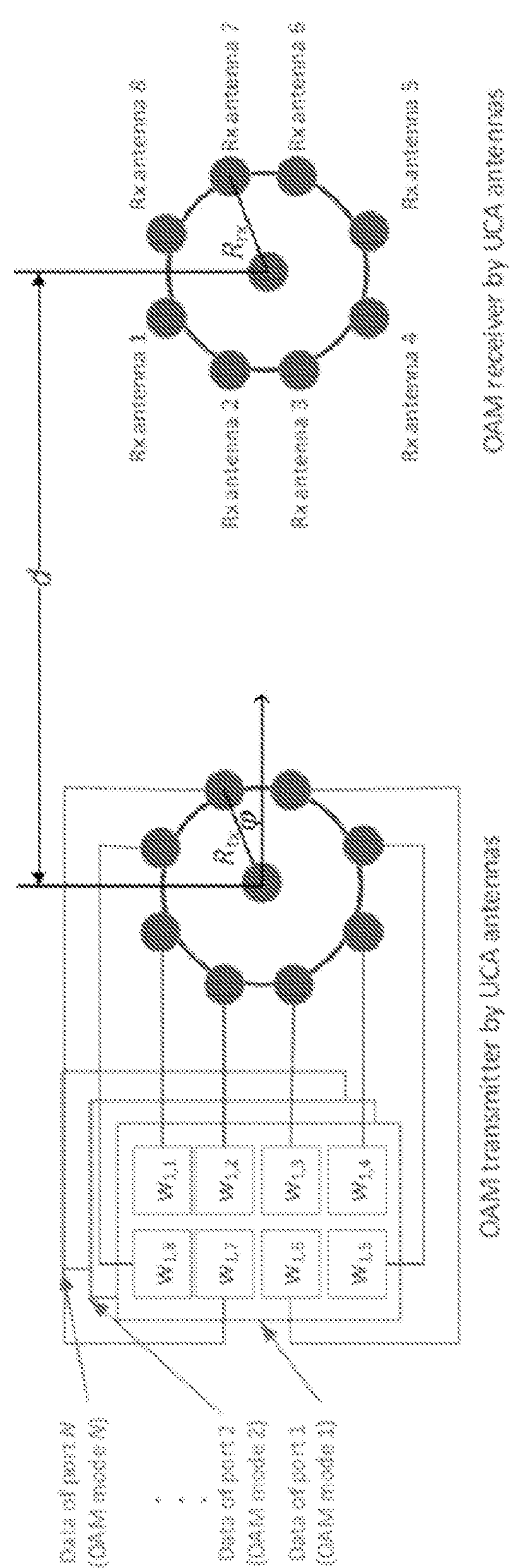
FIG. 5 illustrates an example of an OAM based communication system using uniform circular array (UCA) transmitter antennas and a set of UCA receiver antennas, in accordance with certain aspects of the present disclosure.

FIG. 5 illustrates another example of an OAM based communication system realized using uniform circular array (UCA) transmitter (Tx) antennas and a set of UCA receiver antennas. As illustrated, on the transmit side, the Tx antennas may be evenly equipped (e.g., with a uniform angular spacing) in a circle with a radius $R_{tx}$. By multiplying respective OAM-formed weights $w_1=[w_{1,1}, w_{1,2}, \ldots, w_{1,8}]^T$ onto each antenna, a signal port may generated. If the weight of each antenna is equal to $\exp(i\varphi l)$, where $\varphi$ is the angle of antenna in the circle (e.g., relative to a horizontal axis drawn from an antenna at the center of the circle), $l$ is the OAM mode index, then this OAM-formed port is equivalent OAM mode $l$. By using different OAM-formed weightsexp($i\varphi l'$), where $l' \neq l$, multiple OAM modes are generated. In the illustrated example, N OAM modes are generated.

Similarly, on the receive-side, the OAM receiver also has UCA structure, with a number of Rx antennas evenly equipped (e.g., with a uniform angular spacing) in a circle with a radius $R_{rx}$. Assuming the channel matrix from each transmit antenna to each receive antenna as H, then for the OAM-formed channel matrix $\tilde{H}=H.[w_1, w_2, \ldots, w_L]$, any two columns of $\tilde{H}$ are orthogonal. This generally means that all the OAM channels will have no crosstalk. This is the reason why OAM-based communication can efficiently realize a relatively high-level spatial multiplexing degree. In general, the center antenna of all UCA structure circles can be used alone to generate OAM mode 0.

Various parameters may impact the performance of OAM-based communications systems. For example, in general, a larger radius (for $R_{tx}$ and $R_{rx}$) results in a higher OAM multiplexing degree and a higher collective throughput (of streams on all modes). Similarly, higher frequency typically results in higher OAM multiplexing degree, but with a lower collective throughput. Depending on the (radius/frequency settings), a relatively high number (e.g., multiples of tens) of OAM modes may be used.

Various factors may be considered when choosing between UCA and SPP to transmit multiple orthogonal signals with different OAM modes. SPP-based OAM generates continuous spiral waves and, thus, can form unlimited numbers of orthogonal OAM modes in theory. In practice, however, due to propagation divergence and one mode per SPP, the number of effective OAM modes is typically limited.

UCA-based OAM generates a discrete spiral wave and, thus, can form OAM modes at most with the same number as Tx antennas. UCA-based OAM effectively belongs to multiple-input multiple-output (MIMO) whose eigen-based Tx precoding weights and Rx combining weights are constantly equal to a DFT matrix, which is generally independent of communication parameters (such as distance, aperture size and carrier frequency) and, thus, may be implemented at relatively low cost.

Figure 6A:
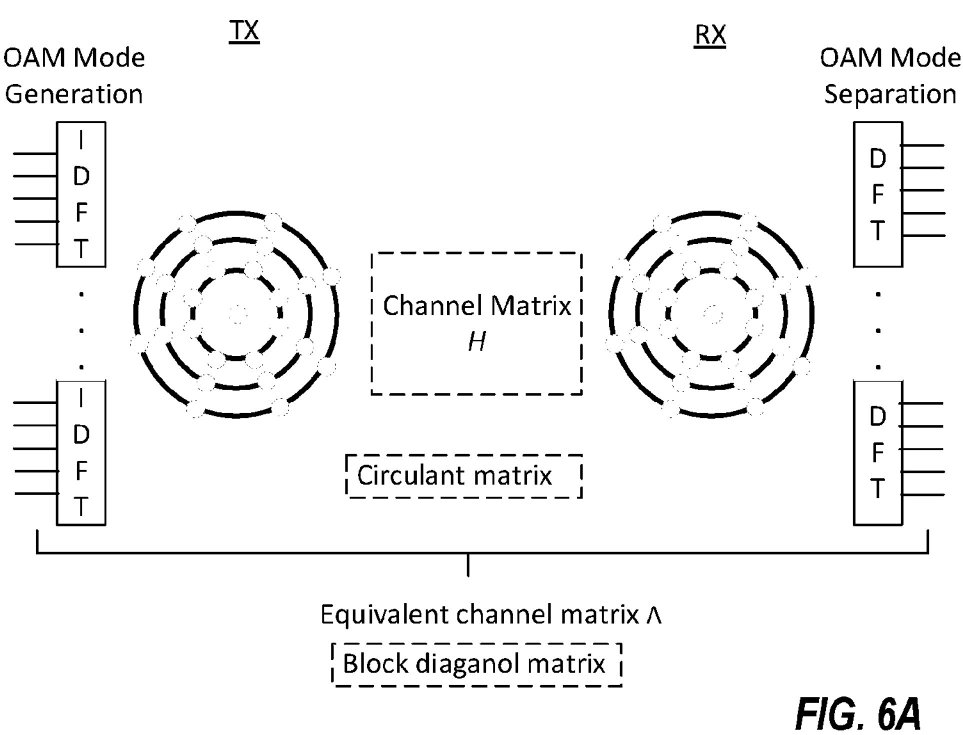
FIGS. 6A and 6B are block diagrams illustrating examples of OAM based wireless communication using multiple circles, in accordance with certain aspects of the present disclosure.
Figure 6B:
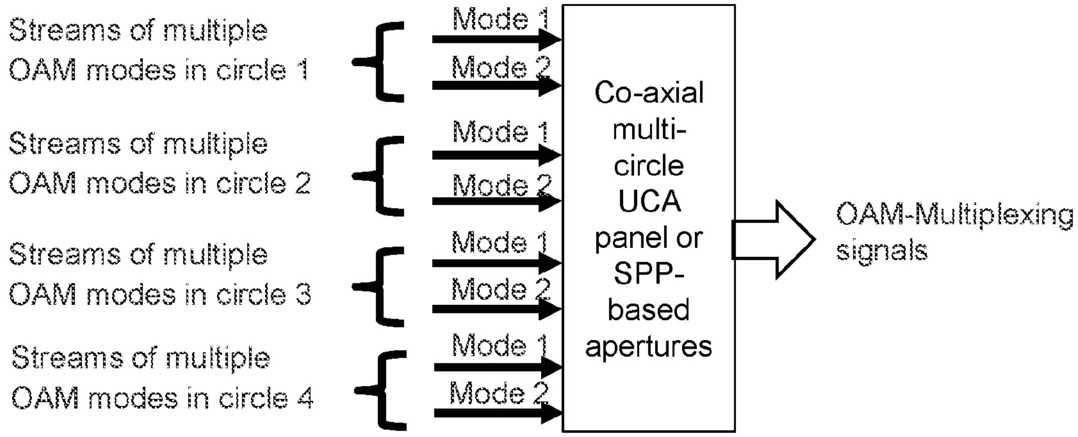

FIG. 6A illustrates an example multi-circle OAM-based communication system. As illustrated, multiple circles (deployed at both transmitter and receiver) may be formed, for example, of multiple co-axis UCA antenna circles or multiple circles of SPP-based apertures. In such deployments, the intra-circle streams are generally orthogonal. The inter-circle streams, on the other hand, are generally orthogonal with different OAM modes, but non-orthogonal with the same OAM mode. Thus, for each OAM mode, there may exist inter-circle interferences where the stream transmitted from one circle is interfered with by the stream transmitted from another circle having the same OAM mode.

The OAM mode based control channel signaling proposed herein may help address a potential problem in existing systems that may limit the transmission of urgent downlink or uplink data.

For example, in current (e.g., LTE/NR) systems, the control channel and data channel are multiplexed using TDM and/or FDM, instead of SDM. This is because the mutual interferences exist among spatial streams, so the multiplexing of spatial streams is typically unstable and possibly changed slot-by-slot.

One potential drawback of this approach (TDM/FDM) is that it does not allow for the control channel to be transmitted in the radio resource that is already assigned to a data channel. This may significantly restrict some urgent control information transmissions. For example, if there is urgent downlink data, a gNB may have to wait for a next control resource set (CORESET) slot/symbol to transmit a physical downlink control channel (PDCCH) to schedule that data. Similarly, if there is urgent uplink data, the UE may have to wait for a next scheduling request (SR) slot/symbol to transmit a SR in order to transmit that data.

This drawback could be addressed by reserving some radio (e.g., time/frequency) resources for possible urgent control channel transmission. This solution is inefficient, however, as these resource may not be used most of the time, resulting in a significantly low utilization ratio. On the other hand, if an urgent control channel were allowed to overwrite the radio resource of some existing data channel, then the gNB or UE may need to increase the detecting/decoding effort (e.g., effectively double the effort to detect/decode both control channel and data channel), which may increase complexity and/or cost. Further, overwriting an urgent control channel would make data channel decoding fail and, thus, make spectrum efficiency suffer.

Example Control Channel Design in OAM-Based Communication System

Aspects of the present disclosure, however, may take advantage of the orthogonality among OAM modes to provide a new control channel that may be used to schedule urgent data in a manner that has little or no impact on current streams (modes) of a data channel.

In some cases, an OAM transmitter may transmit this new control channel on a same time-frequency resource as a data channel or another control channel. This new control channel may be transmitted with a different OAM mode than the data channel or second control channel.

As noted above, the new control channel may be transmitted with the same direction or different directions with the data channel or the other control channel. The new control channel may also be transmitted on different waveforms, for example, a single-carrier waveform or a multi-carrier waveform.

FIGS. 7 and 8 are flow diagrams illustrating operations 700 and 800 from the perspective of an OAM-based transmitter and OAM-based receiver, respectively.

Referring first to FIG. 7, the operations 700 may be performed, for example, by a UE or network entity (e.g., a UE 104 or BS 102 in the wireless communication network 100) to transmit OAM-based control signaling. The operations 700 may be implemented as software components that are executed and run on one or more processors (e.g., controller/processor 240 and/or 280 of FIG. 2). Further, the transmission of signals by the transmitter in operations 700 may be enabled, for example, by one or more antennas (e.g., antennas 252 and/or 234 of FIG. 2). In certain aspects, the transmission of signals by the transmitter may be implemented via a bus interface of one or more processors (e.g., controller/processor 240 and/or 280) outputting signals.

The operations 700 begin, at 710, by transmitting to a receiver, with a first orbital angular momentum (OAM) mode, a first control channel on a first time-frequency resource. At 720, the transmitter transmits to the receiver, with a second OAM mode, at least one of a data channel or a second control channel on a second time-frequency resource that at least partially overlap with the first time-frequency resource in at least one of time or frequency.

Referring first to FIG. 8, the operations 800 are receiver-side operations that may be considered complementary to the transmitter-side operations 700. For example, operations 800 may be performed by a receiver (e.g., a UE 104 or BS 102 in the wireless communication network 100) to receive and process OAM-based control signaling sent from a transmitter performing operations 800 of FIG. 8. Operations 800 may be implemented as software components that are executed and run on one or more processors (e.g., controller/processor 240 and/or 280 of FIG. 2). Further, the reception of signals by the receiver in operations 800 may be enabled, for example, by one or more antennas (e.g., antennas 252 and/or 234 of FIG. 2). In certain aspects, the reception of signals by the receiver may be implemented via a bus interface of one or more processors (e.g., controller/processor 240 and/or 280) obtaining signals.

The operations 800 begin, at 810, by receiving from a transmitter, with a first orbital angular momentum (OAM) mode, a first control channel on a first time-frequency resource. At 820, the receiver receiving from the transmitter, with a second OAM mode, at least one of a data channel or a second control channel on a second time-frequency resource that at least partially overlap with the first time-frequency resource in at least one of time or frequency.

Figures 9A, 9B:
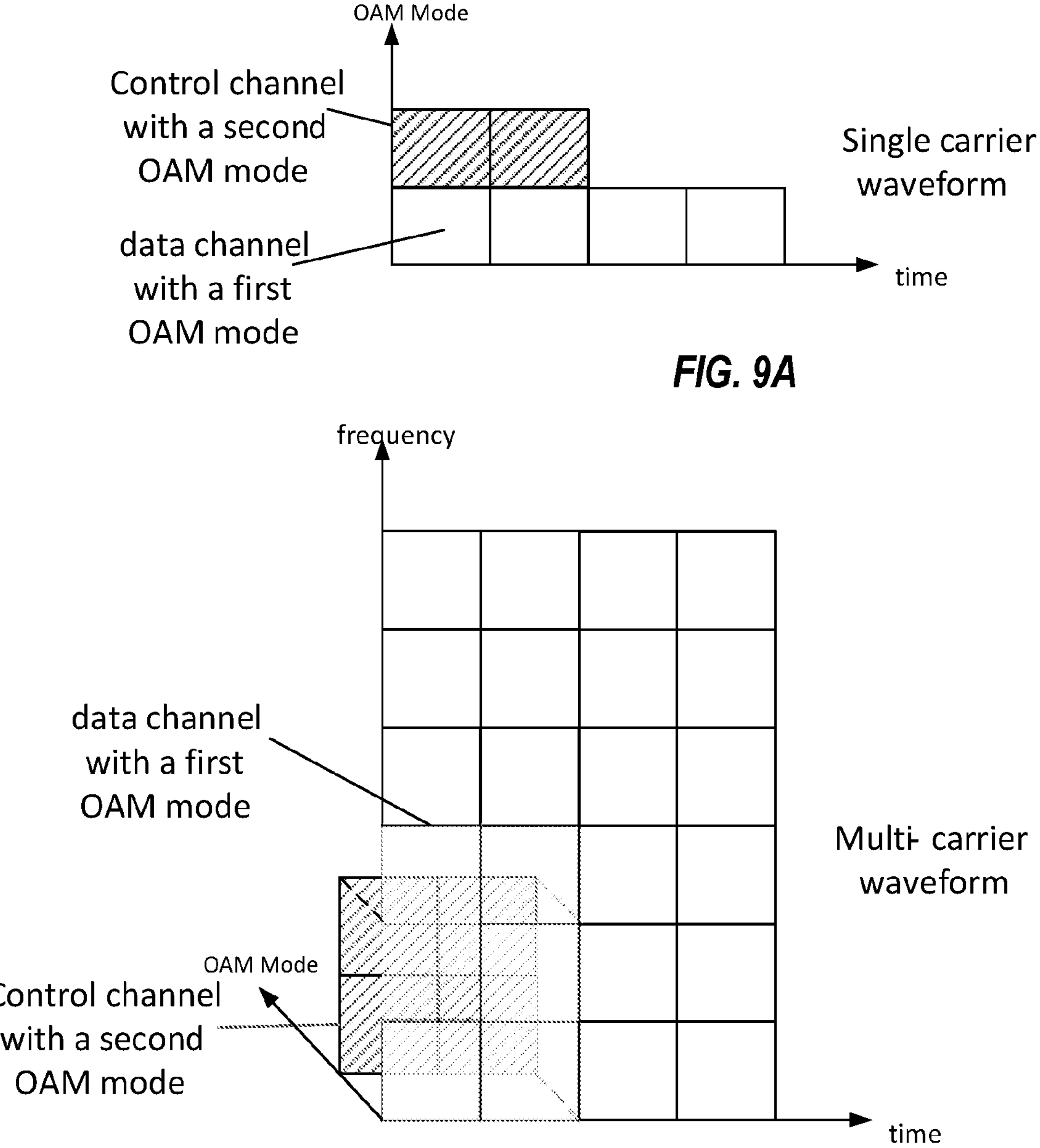
FIGS. 9A and 9B illustrate examples of OAM based control channel signaling, in accordance with certain aspects of the present disclosure.

FIGS. 9A and 9B illustrate examples of how an OAM transmitter may transmit based control channel signaling on same time-frequency resources as a data channel or other control channel. In the illustrated examples, a new control channel is transmitted with a second OAM mode, while the data channel is transmitted with a first OAM mode. As previously noted, the new control channel may be transmitted with the same direction or different directions with the data channel or the other control channel.

As illustrated in FIG. 9A, if a single carrier waveform (such as SC-FDM) is used, in the OAM communication link, the control channel and data channel may be multiplexed via time-division multiplexing (TDM) and (OAM) mode-division multiplexing (MDM). As noted above, MDM may be considered a special kind of SDM in which the spatial channels have constant orthogonality due to orthogonality of different OAM modes. As illustrated in FIG. 9B, if a multi-carrier waveform (such as OFDM) is used in the OAM communication link, the control channel and data channel may be multiplexed in TDM, frequency-division multiplexing (FDM), and MDM.

In some cases, certain OAM modes may be designated or configured an urgent OAM modes. For example, a set of one or more OAM modes (referred to herein as urgent OAM modes) may be reserved for urgent data or control channel transmissions. The set of urgent OAM modes may be specified in a standard or configured by a control node (e.g., an OAM transmitter). One potential benefit of using urgent OAM modes is that it may enable urgent data or control signaling transmission with little or no impact on a current transmission.

If an OAM transmitter or receiver has urgent data (e.g., PDSCH or PUSCH) or control signaling (PDCCH, PUCCH, scheduling request) to send, it may select one of the (unused) urgent OAM modes to send the urgent data or control signaling without grant. In some cases, the OAM transmitter may randomly select one urgent OAM mode out of the urgent OAM mode set. In other cases, the OAM transmitter may select an urgent OAM mode from a small OAM mode index to large OAM mode index (or from large OAM mode index to small OAM mode index).

On the receive side, the OAM receiver may be configured to (always) decode partial or all urgent OAM modes. In some cases (e.g., to keep receiver complexity relatively low), the number of configured urgent OAM modes may be kept relatively small, like only one urgent OAM mode.

In some cases, if an OAM transmitter has unused transmission power, it may use this transmission power to transmit new data/control channel. In some cases, if the OAM transmitter does not have any unused transmission power, it may take (re-allocate) part of the transmission power from the original data channel. If decoding errors occur due to reduced transmission power at the original data channel, soft decoding information (such as log-likelihood ratio) information may be used in retransmission(s).

One significant condition of OAM communication is the directional alignment between the transmitter and receiver. Because those alignment may be destroyed by some sudden or unexpected event (such as a strong wind, a physical displacement, or a broken hardware component, etc.), the alignment status may need to be monitored (e.g., periodically and/or aperiodically).

In some cases, an alignment status monitor can be based on reference signals transmitted in either OAM modes used for data transfer or a set of dedicated OAM modes (referred to herein as tracking OAM modes). In some cases, the tracking OAM mode for an aperiodic alignment status monitor may be considered a kind of urgent OAM mode. One potential benefit of tracking OAM modes proposed herein is the ability to quickly detect misalignment without data transfer interruption.

Once an OAM transmitter or receiver detects misalignment (e.g., by movement/vibration detection, increase of inter-mode interference or data decoding error), it may transmit reference signals in the tracking OAM modes. For example, by transmitting reference signals in one tracking OAM mode, the receiver may be able to estimate the inter-mode interference at the other OAM mode. In some cases, if the degree of (estimated) interference is larger than a threshold, the receiver may trigger a re-alignment operation, which may involve adjusting its own direction and/or informing the transmitter about detected misalignment.

Figure 10:
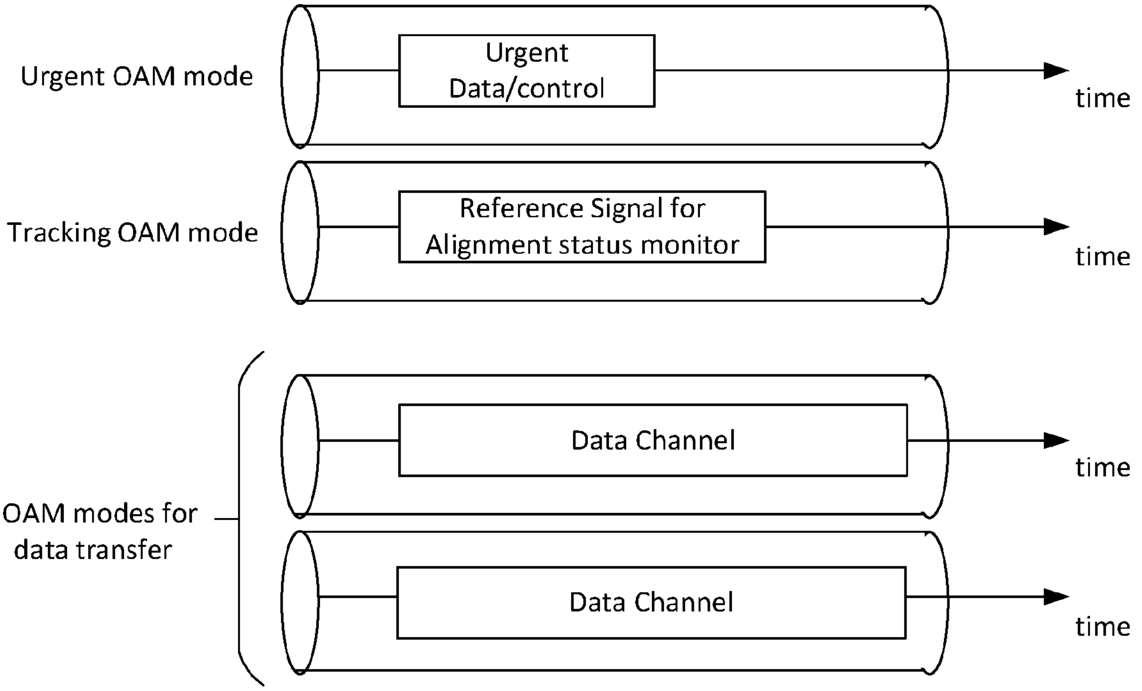
FIG. 10 illustrates an example timeline of OAM based control channel signaling, in accordance with certain aspects of the present disclosure.

FIG. 10 illustrates an example timeline of an Urgent OAM mode and tracking OAM mode, in accordance with certain aspects of the present disclosure. As illustrated, urgent data or control may be sent in an urgent OAM mode. Similarly, a reference signal for alignment status monitoring may be sent on a tracking OAM mode. As illustrated, the transmissions on the urgent OAM mode and tracking OAM mode may not interfere with data channel transmissions on different OAM modes used for data transfer.

In some cases, the control channel in one OAM mode may indicate the data/control transmission in another OAM mode, which may be referred to as cross-mode scheduling. For example, in the content of the cross-mode scheduling control channel (e.g., the DCI of PDCCH), a new field may be used to indicate the index (or indexes) of OAM modes for the data/control channel.

To reduce monitoring overhead, at times when there is no data transfer, the OAM receiver may be configured to monitor only one OAM mode, referred to herein as an anchor OAM mode. This anchor OAM mode may be specified by a standard or could be configured (e.g., by an OAM transmitter). If receiving an indication of data transfer, however, the OAM receiver may start (or restart) to monitor other OAM modes. These other OAM modes may be specified in a standard or configured (e.g., indicated in the control channel transmitted on an anchor OAM mode). An OAM transmitter may also configure a time periodicity for an OAM receiver to monitor the anchor OAM mode, which may help conserve power.

Figure 11:
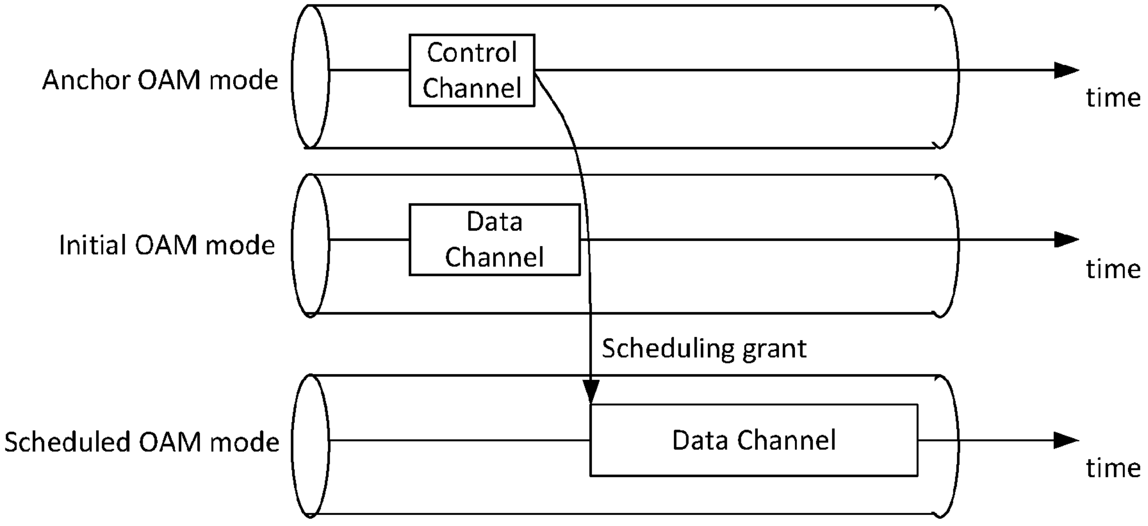
FIG. 11 illustrates another example timeline of OAM based control channel signaling, in accordance with certain aspects of the present disclosure.

As illustrated in FIG. 11, before an OAM receiver completes the decoding of a control channel (e.g., PDCCH) at one OAM mode (an anchor OAM mode) that schedules a transmission on another (scheduled) OAM mode, the OAM transmitter can simultaneously transmit data/control information at another OAM mode, referred to as an initial OAM mode. The initial OAM mode may be specified in a standard or configured by an OAM transmitter.

As illustrated in FIG. 11, the OAM receiver may continue to receive at the initial OAM mode, for example, until the start of transmission at the scheduled OAM mode. Allowing immediate reception of data while decoding the OAM-based PDCCH sent in the anchor OAM mode (prior to the scheduled transmission) may significantly improve overall data rate.

As noted above, various OAM modes described herein (e.g., urgent OAM modes, tracking OAM modes, anchor OAM modes, and/or initial OAM modes) may be specified by standards and/or configured. In some cases, the OAM transmitter and/or receiver behavior for using these OAM modes may also be specified by standards and/or configured.

Example Wireless Communication Devices

Figure 12:
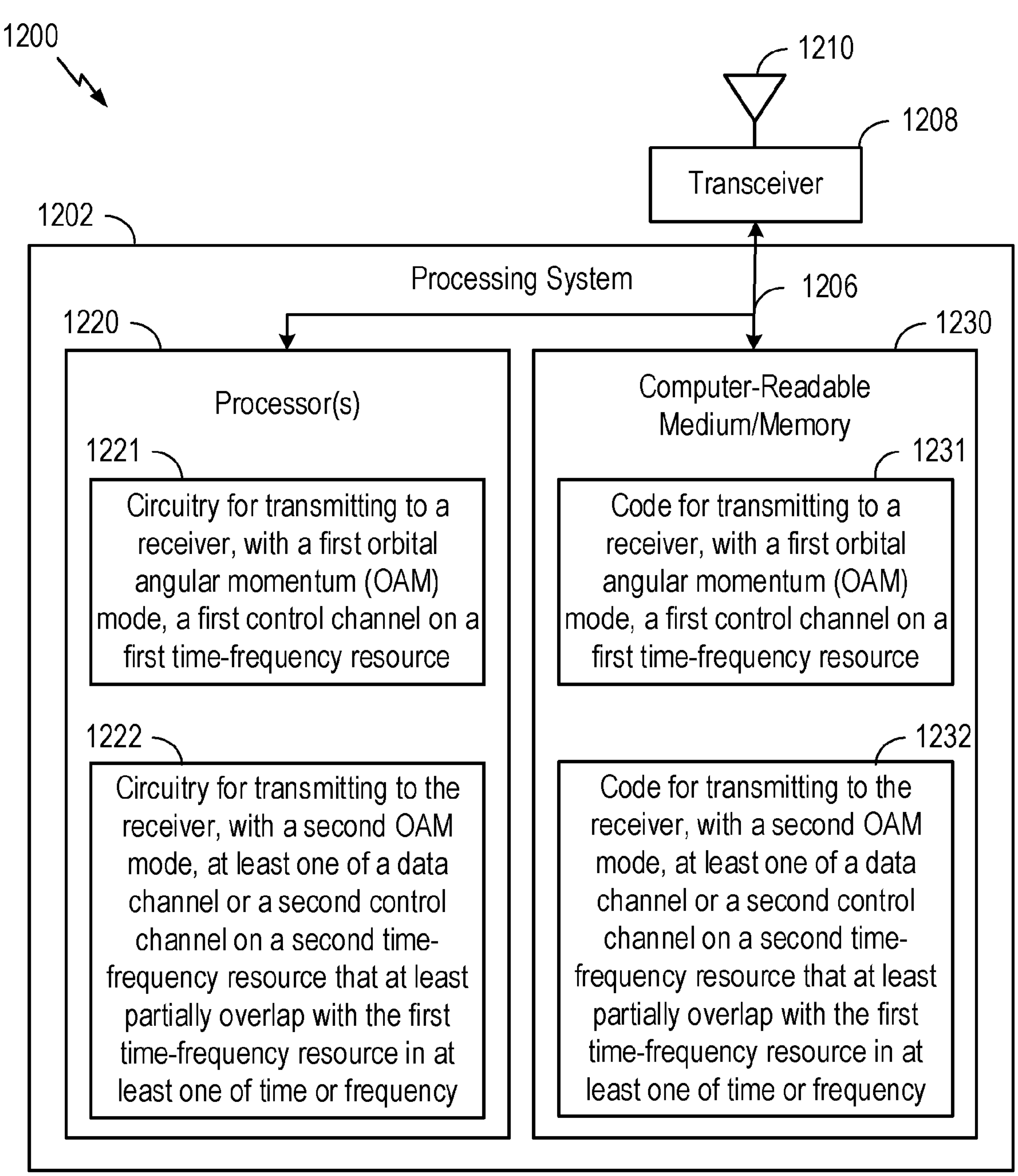
FIGS. 12-13 depict devices with example components capable of performing OAM based control signaling, in accordance with aspects of the present disclosure.

FIG. 12 depicts an example communications device 1200 that includes various components operable, configured, or adapted to perform operations for the techniques disclosed herein, such as the operations depicted and described with respect to FIG. 7. In some examples, communication device 1200 may be a user equipment 104 or BS 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 7.

In the depicted example, computer-readable medium/memory 1230 stores code 1231 (e.g., an example of means for) for transmitting to a receiver, with a first orbital angular momentum (OAM) mode, a first control channel on a first time-frequency resource; and code 1232 (e.g., an example of means for) for transmitting to the receiver, with a second OAM mode, at least one of a data channel or a second control channel on a second time-frequency resource that at least partially overlap with the first time-frequency resource in at least one of time or frequency.

In the depicted example, the one or more processors 1220 include circuitry configured to implement the code stored in the computer-readable medium/memory 1230, including circuitry 1221 (e.g., an example of means for) for transmitting to a receiver, with a first orbital angular momentum (OAM) mode, a first control channel on a first time-frequency resource; and circuitry 1222 (e.g., an example of means for) for transmitting to the receiver, with a second OAM mode, at least one of a data channel or a second control channel on a second time-frequency resource that at least partially overlap with the first time-frequency resource in at least one of time or frequency.

Various components of communications device 1200 may provide means for performing the methods described herein, including with respect to FIG. 7.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

Notably, FIG. 12 is just use example, and many other examples and configurations of communication device 1200 are possible.

Figure 13:
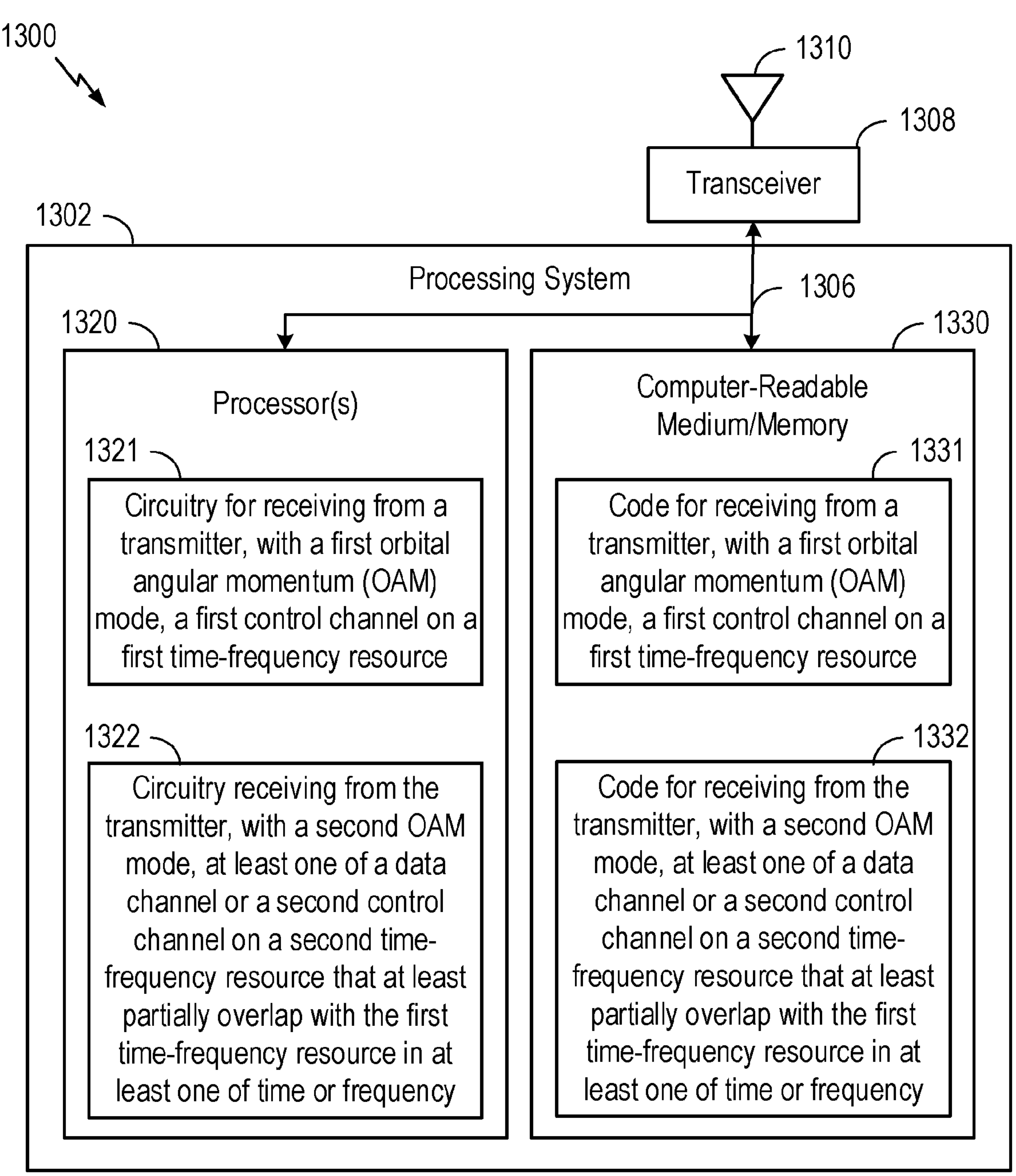

FIG. 13 depicts an example communications device 1300 that includes various components operable, configured, or adapted to perform operations for the techniques disclosed herein, such as the operations depicted and described with respect to FIG. 8. In some examples, communication device 1300 may be a user equipment 104 or BS 102 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 8.

In the depicted example, computer-readable medium/memory 1330 stores code 1331 (e.g., an example of means for) for receiving from a transmitter, with a first orbital angular momentum (OAM) mode, a first control channel on a first time-frequency resource; and code 1332 (e.g., an example of means for) for receiving from the transmitter, with a second OAM mode, at least one of a data channel or a second control channel on a second time-frequency resource that at least partially overlap with the first time-frequency resource in at least one of time or frequency.

In the depicted example, the one or more processors 1320 include circuitry configured to implement the code stored in the computer-readable medium/memory 1330, including circuitry 1321 (e.g., an example of means for) for receiving from a transmitter, with a first orbital angular momentum (OAM) mode, a first control channel on a first time-frequency resource; and circuitry 1322 (e.g., an example of means for) for receiving from the transmitter, with a second OAM mode, at least one of a data channel or a second control channel on a second time-frequency resource that at least partially overlap with the first time-frequency resource in at least one of time or frequency.

Various components of communications device 1300 may provide means for performing the methods described herein, including with respect to FIG. 8.

In some examples, means for receiving (or means for obtaining) may include the transceivers 254 and/or antenna (s) 252 of the user equipment 104 illustrated in FIG. 2 and/or transceiver 1308 and antenna 1310 of the communication device 1300 in FIG. 13.

Notably, FIG. 13 is just use example, and many other examples and configurations of communication device 1300 are possible.

Example Aspects

Implementation examples are described in the following numbered aspects:

Aspect 1: A method for wireless communications by a transmitter, comprising: transmitting to a receiver, with a first orbital angular momentum (OAM) mode, a first control channel on a first time-frequency resource; and transmitting to the receiver, with a second OAM mode, at least one of a data channel or a second control channel on a second time-frequency resource that at least partially overlap with the first time-frequency resource in at least one of time or frequency.

Aspect 2: The method of Aspect 1, wherein the first control channel and the data channel or second control channel are: transmitted using a single carrier waveform; and multiplexed using time division multiplexing (TDM) and OAM mode division multiplexing (MDM).

Aspect 3: The method of any one of Aspects 1-2, wherein the first control channel and the data channel or second control channel are: transmitted using a multi-carrier waveform; and multiplexed using time division multiplexing (TDM), frequency division multiplexing (FDM), and OAM mode division multiplexing (MDM).

Aspect 4: The method of any one of Aspects 1-3, wherein the first control channel and the data channel or second control channel are transmitted in different directions.

Aspect 5: The method of any one of Aspects 1-4, further comprising at least one of: selecting the first OAM mode, from a set of reserved OAM modes, to indicate a priority of the first control channel; or selecting the second OAM mode, from the set of reserved OAM modes, to indicate a priority of the data channel or second control channel.

Aspect 6: The method of Aspect 5, wherein at least one of selecting the first OAM mode or selecting the second OAM mode comprises: randomly selecting an OAM mode from the set of reserved OAM modes; or selecting an OAM mode from the set of reserved OAM modes, based on a corresponding OAM mode index.

Aspect 7: The method of Aspect 5, further comprising boosting transmit power of at least one of the first control channel, the data channel, or the second control channel, that is transmitted with one of the reserved OAM modes.

Aspect 8: The method of any one of Aspects 1-7, further comprising: transmitting alignment tracking reference signals in one or more OAM modes; and receiving feedback, from the receiver, indicating misalignment detected based on the alignment tracking reference signals.

Aspect 9: The method of Aspect 8, wherein the alignment tracking reference signals are transmitted on at least one of: the first OAM mode; the second OAM mode; or a set of one or more OAM modes reserved for alignment tracking.

Aspect 10: The method of any one of Aspects 1-9, wherein: the first control channel transmitted with the first OAM mode schedules at least one of a data channel or a control channel to be transmitted with another OAM mode.

Aspect 11: The method of Aspect 10, wherein the first control channel comprises a physical downlink control channel (PDCCH) with a downlink control information (DCI) field that indicates an index for the other OAM mode with which the data channel or control channel scheduled by the first control channel is to be transmitted.

Aspect 12: The method of Aspect 10, wherein the first OAM mode comprises an anchor OAM mode the transmitter uses to indicate a data transfer.

Aspect 13: The method of Aspect 12, further comprising configuring the receiver to periodically monitor the anchor OAM mode for indications of data transfer.

Aspect 14: The method of Aspect 10, wherein: the first OAM mode comprises an anchor OAM mode; and the transmitter transmits the at least one of the data channel or the second control channel on the second OAM mode prior to transmitting the data channel or control channel scheduled by the first control channel.

Aspect 15: A method for wireless communications by a receiver, comprising: receiving from a transmitter, with a first orbital angular momentum (OAM) mode, a first control channel on a first time-frequency resource; and receiving from the transmitter, with a second OAM mode, at least one of a data channel or a second control channel on a second time-frequency resource that at least partially overlap with the first time-frequency resource in at least one of time or frequency.

Aspect 16: The method of Aspect 15, wherein the first control channel and the data channel or second control channel are: received as a single carrier waveform; and multiplexed using time division multiplexing (TDM) and OAM mode division multiplexing (MDM).

Aspect 17: The method of any one of Aspects 15-16, wherein the first control channel and the data channel or second control channel are: received as a multi-carrier waveform; and multiplexed using time division multiplexing (TDM), frequency division multiplexing (FDM), and OAM mode division multiplexing (MDM).

Aspect 18: The method of any one of Aspects 15-17, wherein the first control channel and the data channel or second control channel are received in different directions.

Aspect 19: The method of any one of Aspects 15-18, further comprising at least one of: determining, based on the first OAM mode, a priority of the first control channel; or determining, based on the second OAM mode, a priority of the data channel or second control channel.

Aspect 20: The method of any one of Aspects 15-19, further comprising: receiving alignment tracking reference signals in one or more OAM modes; and providing feedback, to the transmitter, indicating misalignment detected based on the alignment tracking reference signals.

Aspect 21: The method of Aspect 20, wherein the alignment tracking reference signals are received on at least one of: the first OAM mode; the second OAM mode; or a set of one or more OAM modes reserved for alignment tracking.

Aspect 22: The method of any one of Aspects 15-21, wherein: the first control channel transmitted with the first OAM mode schedules at least one of a data channel or a control channel to be transmitted with another OAM mode.

Aspect 23: The method of Aspect 22, wherein the first control channel comprises a physical downlink control channel (PDCCH) with a downlink control information (DCI) field that indicates an index for the other OAM mode with which the data channel or control channel scheduled by the first control channel is to be transmitted.

Aspect 24: The method of Aspect 22, wherein the first OAM mode comprises an anchor OAM mode the receiver monitors for indications of a data transfer.

Aspect 25: The method of Aspect 24, further comprising receiving signaling from the transmitter configuring the receiver to periodically monitor the anchor OAM mode for indications of data transfer.

Aspect 26: The method of Aspect 22, wherein: the first OAM mode comprises an anchor OAM mode; and the receiver receives the at least one of the data channel or the second control channel on the second OAM mode prior to receiving the data channel or control channel scheduled by the first control channel.

Aspect 27: An apparatus for wireless communications, comprising means for performing the method of any one or more of Aspects 1-26.

Aspect 28: An apparatus for wireless communications, comprising a memory and a processor coupled with the memory, the memory and the processor configured to perform the Aspect of any one or more of Aspects 1-26.

Aspect 29: A computer-readable medium having instructions stored thereon which, when executed by a processor, performs the method of any one or more of Aspects 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mm Wave frequencies, the gNB 180 may be referred to as an mm Wave base station. The gNB 180 may also communicate with one or more UEs 104 via a beam formed connection 182 (e.g., via beams 182' and 182").

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink (SL) channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where Dis DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of NR and LTE sidelink co-channel co-existence in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first device, comprising:

a processing system configured to cause the first device to:

transmit, in accordance with a first orbital angular momentum (OAM) mode, a first control channel on a first time-frequency resource;

transmit, in accordance with a second OAM mode, at least one of a data channel or a second control channel on a second time-frequency resource that at least partially overlap with the first time-frequency resource in at least one of time or frequency; and perform at least one of:

select the first OAM mode, from a set of reserved OAM modes, to indicate a priority of the first control channel; or select the second OAM mode, from the set of reserved OAM modes, to indicate a priority of the data channel or second control channel.

2. The first device of claim 1, wherein the first control channel and the data channel or second control channel are:

transmitted using a single carrier waveform; and multiplexed using time division multiplexing (TDM) and OAM mode division multiplexing (MDM).

3. The first device of claim 1, wherein the first control channel and the data channel or second control channel are:

transmitted using a multi-carrier waveform; and multiplexed using time division multiplexing (TDM), frequency division multiplexing (FDM), and OAM mode division multiplexing (MDM).

4. The first device method of claim 1, wherein the first control channel and the data channel or second control channel are transmitted in different directions.

5. The first device of claim 1, wherein, to perform at least one of selection of the first OAM mode or selection of the second OAM mode, the processing system is configured to cause the first device to select the first OAM mode, and wherein, to select the first OAM mode, the processing system is configured to cause the first device to:

randomly select the first OAM mode from the set of reserved OAM modes.

6. The first device of claim 1, wherein the processing system is configured to cause the first device to boost transmit power of at least one of the first control channel, the data channel, or the second control channel, that is transmitted with one of the reserved OAM modes.

7. The first device of claim 1, wherein, to perform at least one of selection of the first OAM mode or selection of the second OAM mode, the processing system is configured to cause the first device to select the second OAM mode, and wherein, to select the second OAM mode, the processing system is configured to cause the first device to:

randomly select the second OAM mode from the set of reserved OAM modes.

8. The first device of claim 1, wherein, to perform at least one of selection of the first OAM mode or selection of the second OAM mode, the processing system is configured to cause the first device to select the first OAM mode, and wherein, to select the first OAM mode, the processing system is configured to cause the first device to:

select, based on a corresponding OAM mode index, the first OAM mode from the set of reserved OAM modes.

9. The first device of claim 1, wherein, to perform at least one of selection of the first OAM mode or selection of the second OAM mode, the processing system is configured to cause the first device to select the second OAM mode, and wherein, to select the second OAM mode, the processing system is configured to cause the first device to:

select, based on a corresponding OAM mode index, the second OAM mode from the set of reserved OAM modes.

10. The first device of claim 1, wherein at least one of:

wherein to perform at least one of selection of the first OAM mode or selection of the second OAM mode, the processing system is configured to cause the first device to select the first OAM mode, and wherein, to select the first OAM mode, the processing system is configured to cause the first device to randomly select the first OAM mode from the set of reserved OAM modes;

wherein, to perform at least one of selection of the first OAM mode or selection of the second OAM mode, the processing system is configured to cause the first device to select the second OAM mode, and wherein, to select the second OAM mode, the processing system is configured to cause the first device to randomly select the second OAM mode from the set of reserved OAM modes;

wherein, to perform at least one of selection of the first OAM mode or selection of the second OAM mode, the processing system is configured to cause the first device to select the first OAM mode, and wherein, to select the first OAM mode, the processing system is configured to cause the first device to select, based on a corresponding OAM mode index, the first OAM mode from the set of reserved OAM modes; or wherein, to perform at least one of selection of the first OAM mode or selection of the second OAM mode, the processing system is configured to cause the first device to select the second OAM mode, and wherein, to select the second OAM mode, the processing system is configured to cause the first device to select, based on a corresponding OAM mode index, the second OAM mode from the set of reserved OAM modes.

11. A first device, comprising:

a processing system configured to cause the first device to:

transmit, in accordance with a first orbital angular momentum (OAM) mode, a first control channel on a first time-frequency resource;

transmit, in accordance with a second OAM mode, at least one of a data channel or a second control channel on a second time-frequency resource that at least partially overlap with the first time-frequency resource in at least one of time or frequency;

transmit alignment tracking reference signals in accordance with one or more OAM modes; and receive feedback indicating misalignment detected based on the alignment tracking reference signals.

12. The first device of claim 11, wherein, to transmit the alignment tracking reference signals, the processing system is configured to cause the first device to transmit the alignment tracking reference signals in accordance with at least one of:

the first OAM mode;

the second OAM mode; or a set of one or more OAM modes reserved for alignment tracking.

13. A first device, comprising:

a processing system configured to cause the first device to:

transmit, in accordance with a first orbital angular momentum (OAM) mode, a first control channel on a first time-frequency resource; and transmit, in accordance with a second OAM mode, at least one of a data channel or a second control channel on a second time-frequency resource that at least partially overlap with the first time-frequency resource in at least one of time or frequency, wherein the first control channel transmitted in accordance with the first OAM mode schedules at least one of a data channel or a control channel to be transmitted with another OAM mode, and wherein the first control channel comprises a physical downlink control channel (PDCCH) with a downlink control information (DCI) field that indicates an index for the other OAM mode with which the data channel or control channel scheduled by the first control channel is to be transmitted.

14. A first device, comprising:

a processing system configured to cause the first device to:

transmit, in accordance with a first orbital angular momentum (OAM) mode, a first control channel on a first time-frequency resource; and transmit, in accordance with a second OAM mode, at least one of a data channel or a second control channel on a second time-frequency resource that at least partially overlap with the first time-frequency resource in at least one of time or frequency, wherein the first OAM mode comprises an anchor OAM mode the transmitter uses to indicate a data transfer.

15. The first device of claim 14, wherein, to transmit the first control channel, the processing system is configured to cause the first device to transmit the first control channel to a second device, wherein, to transmit at least one of the data channel or the second control channel, the processing system is configured to cause the first device to transmit at least one of the data channel or the second control channel to the second device, and wherein the processing system is configured to cause the first device to configure the second device to periodically monitor the anchor OAM mode for indication of data transfer.

16. The first device of claim 14, wherein the first control channel transmitted in accordance with the first OAM mode schedules at least one of a data channel or a control channel to be transmitted with another OAM mode.

17. A first device, comprising:

a processing system configured to cause the first device to:

transmit, in accordance with a first orbital angular momentum (OAM) mode, a first control channel on a first time-frequency resource;

transmit, in accordance with a second OAM mode, at least one of a data channel or a second control channel on a second time-frequency resource that at least partially overlap with the first time-frequency resource in at least one of time or frequency, wherein the first control channel transmitted in accordance with the first OAM mode schedules at least one of a data channel or a control channel to be transmitted in accordance with another OAM mode, wherein the first control channel transmitted in accordance with the first OAM mode schedules at least one of a data channel or a control channel to be transmitted in accordance with another OAM mode, wherein the first OAM mode comprises an anchor OAM mode, and wherein, to transmit the at least one of the data channel or the second control channel in accordance with the second OAM mode, the processing system is configured to transmit the at least one of the data channel or the second control channel in accordance with the second OAM mode prior to transmission of the data channel or control channel scheduled by the first control channel.

18. A method for wireless communications by a receiver first device, comprising:

a processing system configured to cause the first device to:

receive, in accordance with a first orbital angular momentum (OAM) mode, a first control channel on a first time-frequency resource;

receive, in accordance with a second OAM mode, at least one of a data channel or a second control channel on a second time-frequency resource that at least partially overlap with the first time-frequency resource in at least one of time or frequency; and perform at least one of:

determine, based on the first OAM mode, a priority of the first control channel; or determine, based on the second OAM mode, a priority of the data channel or second control channel.

19. The first device of claim 18, wherein the first control channel and the data channel or second control channel are:

received as a single carrier waveform; and multiplexed using time division multiplexing (TDM) and OAM mode division multiplexing (MDM).

20. The first device of claim 18, wherein the first control channel and the data channel or second control channel are:

received as a multi-carrier waveform; and multiplexed using time division multiplexing (TDM), frequency division multiplexing (FDM), and OAM mode division multiplexing (MDM).

21. The first device of claim 18, wherein the first control channel and the data channel or second control channel are received in different directions.

22. The first device of claim 18, wherein:

the first control channel received in accordance with the first OAM mode schedules at least one of a data channel or a control channel to be received in accordance with another OAM mode.

23. A first device, comprising:

a processing system configured to cause the first device to:

receive, in accordance with a first orbital angular momentum (OAM) mode, a first control channel on a first time-frequency resource;

receive, in accordance with a second OAM mode, at least one of a data channel or a second control channel on a second time-frequency resource that at least partially overlap with the first time-frequency resource in at least one of time or frequency;

receive alignment tracking reference signals in accordance with one or more OAM modes; and provide feedback indicating misalignment detected based on the alignment tracking reference signals.

24. The first device of claim 23, wherein, to receive the alignment tracking reference signals, the processing system is configured to cause the first device to receive the alignment tracking reference signals in accordance with at least one of:

the first OAM mode;

the second OAM mode; or a set of one or more OAM modes reserved for alignment tracking.

25. A first device, comprising:

a processing system configured to cause the first device to:

receive, in accordance with a first orbital angular momentum (OAM) mode, a first control channel on a first time-frequency resource; and receive, in accordance with a second OAM mode, at least one of a data channel or a second control channel on a second time-frequency resource that at least partially overlap with the first time-frequency resource in at least one of time or frequency, wherein the first control channel received in accordance with the first OAM mode schedules at least one of a data channel or a control channel to be received in accordance with another OAM mode, and wherein the first control channel comprises a physical downlink control channel (PDCCH) with a downlink control information (DCI) field that indicates an index for the other OAM mode with which the data channel or control channel scheduled by the first control channel is to be received.

26. A first device, comprising:

a processing system configured to cause the first device to:

receive, in accordance with a first orbital angular momentum (OAM) mode, a first control channel on a first time-frequency resource; and receive, in accordance with a second OAM mode, at least one of a data channel or a second control channel on a second time-frequency resource that at least partially overlap with the first time-frequency resource in at least one of time or frequency, wherein the first OAM mode comprises an anchor OAM mode the receiver monitors for indications of a data transfer.

27. The first device of claim 26, wherein the processing system is configured to cause the first device to receive signaling that configures the first device to periodically monitor the anchor OAM mode for indication of data transfer.

28. The first device of claim 26, wherein the first control channel received in accordance with the first OAM mode schedules at least one of a data channel or a control channel to be received in accordance with another OAM mode.

29. A first device, comprising:

a processing system configured to cause the first device to:

transmit, in accordance with a first orbital angular momentum (OAM) mode, a first control channel on a first time-frequency resource; and transmit, in accordance with a second OAM mode, at least one of a data channel or a second control channel on a second time-frequency resource that at least partially overlap with the first time-frequency resource in at least one of time or frequency, wherein the first control channel received in accordance with the first OAM mode schedules at least one of a data channel or a control channel to be received in accordance with another OAM mode, wherein the first OAM mode comprises an anchor OAM mode, and wherein, to receive the at least one of the data channel or the second control channel in accordance with the second OAM mode, the processing system is configured to receive the at least one of the data channel or the second control channel in accordance with the second OAM mode prior to reception of receiving the data channel or control channel scheduled by the first control channel.

* * * * *